(12) United States Patent
Beroth

(10) Patent No.: US 10,450,070 B2
(45) Date of Patent: Oct. 22, 2019

(54) AIRCRAFT PASSENGER SEAT ASSEMBLY INCLUDING A BACKREST TILT APPARATUS

(71) Applicant: Rockwell Collins, Inc., Cedar Rapids, IA (US)

(72) Inventor: Michael Beroth, Winston-Salem, NC (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 225 days.

(21) Appl. No.: 15/718,602

(22) Filed: Sep. 28, 2017

(65) Prior Publication Data

US 2018/0086468 A1 Mar. 29, 2018

Related U.S. Application Data

(60) Provisional application No. 62/401,014, filed on Sep. 28, 2016.

(51) Int. Cl.
  *B64D 11/06* (2006.01)
(52) U.S. Cl.
  CPC ........ *B64D 11/064* (2014.12); *B64D 11/0641* (2014.12); *B64D 11/0642* (2014.12); *B64D 11/0643* (2014.12); *B64D 11/0644* (2014.12); *B64D 11/0648* (2014.12); *B64D 11/06395* (2014.12)
(58) Field of Classification Search
  CPC ............ B64D 11/06395; B64D 11/064; B64D 11/0641; B64D 11/0642; B64D 11/0643; B64D 11/0644; B64D 11/0648

USPC .................................................... 244/122 R
See application file for complete search history.

(56) References Cited

U.S. PATENT DOCUMENTS

| | | | | |
|---|---|---|---|---|
| 7,293,740 B2 * | 11/2007 | Defilla | ............... | B64D 11/0689 244/118.6 |
| 7,837,261 B2 * | 11/2010 | Baumann | ............... | B64D 11/06 297/216.1 |
| 8,087,729 B2 * | 1/2012 | Kladde | .................. | B60N 2/181 297/445.1 |
| 9,061,766 B2 * | 6/2015 | Kladde | .................. | B64D 11/06 |
| 2001/0033101 A1 * | 10/2001 | Plant | .................... | A47C 1/0352 297/342 |
| 2002/0063449 A1 * | 5/2002 | Plant | ....................... | B60N 2/34 297/68 |

(Continued)

*Primary Examiner* — Claude J Brown
(74) *Attorney, Agent, or Firm* — Clements Bernard Walker PLLC

(57) ABSTRACT

An aircraft passenger seat has a seat back including a lower portion pivotably mounted to a seat bottom and an upper portion rotatably coupled to the lower portion. The upper portion may rotate in a forward direction relative to the lower portion during articulation of the seat. An inner diaphragm may be positioned between a headrest and a set of side frame members of the upper portion and is rotatably coupled to the upper portion and lower portion to provide support for an upper back and shoulders of a seated passenger. An actuating assembly may coordinate articulation of the lower portion, the upper portion, and the inner diaphragm to permit articulation of the seat between an upright taxi takeoff and landing (TTOL) position and a reclined position and to enable the seated passenger to achieve more ergonomic postures.

15 Claims, 10 Drawing Sheets

(56) References Cited

U.S. PATENT DOCUMENTS

| | | | |
|---|---|---|---|
| 2004/0080201 A1* | 4/2004 | Verny | B64D 11/06 297/354.13 |
| 2004/0099766 A1* | 5/2004 | Pratt, Jr. | B64D 11/06 244/118.6 |
| 2004/0100138 A1* | 5/2004 | Johnson | B64D 11/0015 297/452.18 |
| 2004/0232283 A1* | 11/2004 | Ferry | B60N 2/206 244/118.6 |
| 2007/0228794 A1* | 10/2007 | Penley | B60N 2/2236 297/354.1 |
| 2007/0262635 A1* | 11/2007 | Johnson | B64D 11/0649 297/452.33 |
| 2010/0308167 A1* | 12/2010 | Hawkins | B60N 2/181 244/122 R |
| 2015/0136904 A1* | 5/2015 | Savard | B64D 11/06 244/118.6 |
| 2017/0113802 A1* | 4/2017 | Ozaki | B60N 2/3011 |
| 2018/0215469 A1* | 8/2018 | Uriu | B60N 2/22 |

* cited by examiner

AIRCRAFT PASSENGER SEAT ASSEMBLY INCLUDING A BACKREST TILT APPARATUS

RELATED APPLICATIONS

This application claims priority to U.S. Provisional Patent Application Ser. No. 62/401,014, entitled "Passenger Seat Backrest Tilt," filed Sep. 28, 2016. This application incorporates by reference, in their entirety, the following prior patent applications by B/E Aerospace, Inc. directed to an articulating aircraft seat back frame: U.S. patent application Ser. No. 15/282,352, entitled "Aircraft Seat with Segmented Seatback for Achieving In-Bed Lounge Sitting Position," filed Sep. 30, 2016; and U.S. patent application Ser. No. 14/247,850 entitled "Vehicle Seat with Simultaneous Articulation of Seat Pan and Seat Back" and filed Apr. 8, 2014, now U.S. Pat. No. 9,284,055. All above identified applications are hereby incorporated by reference in their entireties.

BACKGROUND

The present disclosure relates to deployable aircraft "sleeper" seats such as those provided in premium class accommodations of a passenger aircraft (e.g., first class, business class) that articulate between an upright, taxi, take-off, and landing (TTOL) positioned, a reclined positioned, and a lie-flat (e.g., bed) position. The features of these aircraft seats may provide a more comfortable experience for passengers on long-haul flights.

In some conventional implementations, the deployable aircraft seats may include actuators that are responsible for cooperatively controlling movement of various components of the aircraft seat, such as the seat back, seat bottom, and leg rest. The actuator and associated components such as motors, circuitry, and cabling, contribute to an overall weight of the aircraft seat, which can limit the number of sleeper seats that can be added to the aircraft. In addition, these conventional seats may rely on a multitude of articulated elements, e.g. seatback, headrest, or legrest, to increase passenger comfort which may result in difficulty to adjust and find a comfortable position. For example, in these conventional seats each articulated element may have to be independently and successively actuated one by one.

SUMMARY OF ILLUSTRATIVE EMBODIMENTS

The forgoing general description of the illustrative implementations and the following detailed description thereof are merely exemplary aspects of the teachings of this disclosure, and are not restrictive.

In certain embodiments, an aircraft passenger seat with actuator-controlled components may include a seat back pivotably mounted to a seat bottom to permit varying the angle of the seat back relative to the seat bottom between an upright taxi takeoff and landing (TTOL) position and a reclined position. The seat back may include a lower portion pivotably mounted to the seat bottom frame at a first pivot point and an upper portion rotatably coupled to the lower portion. The upper portion may include a headrest mounted at an upper end and forward of a first set of side frame members and may articulate in a forward direction relative to the lower portion about a second pivot point between the upper portion and the lower portion. An inner diaphragm may be positioned between the headrest and the set of side frame members. The inner diaphragm may be rotatably coupled to the upper portion and lower portion at the second pivot point and articulate independently of the upper portion to provide support for an upper back and shoulders of a seated passenger. An actuator mounted to the seat back frame may control articulation of the seat between the upright TTOL and reclined position and may cause coordinated articulation of the lower portion, the upper portion, and the inner diaphragm to enable the seated passenger to achieve more ergonomic postures.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION OF ILLUSTRATIVE EMBODIMENTS

Figure 1:
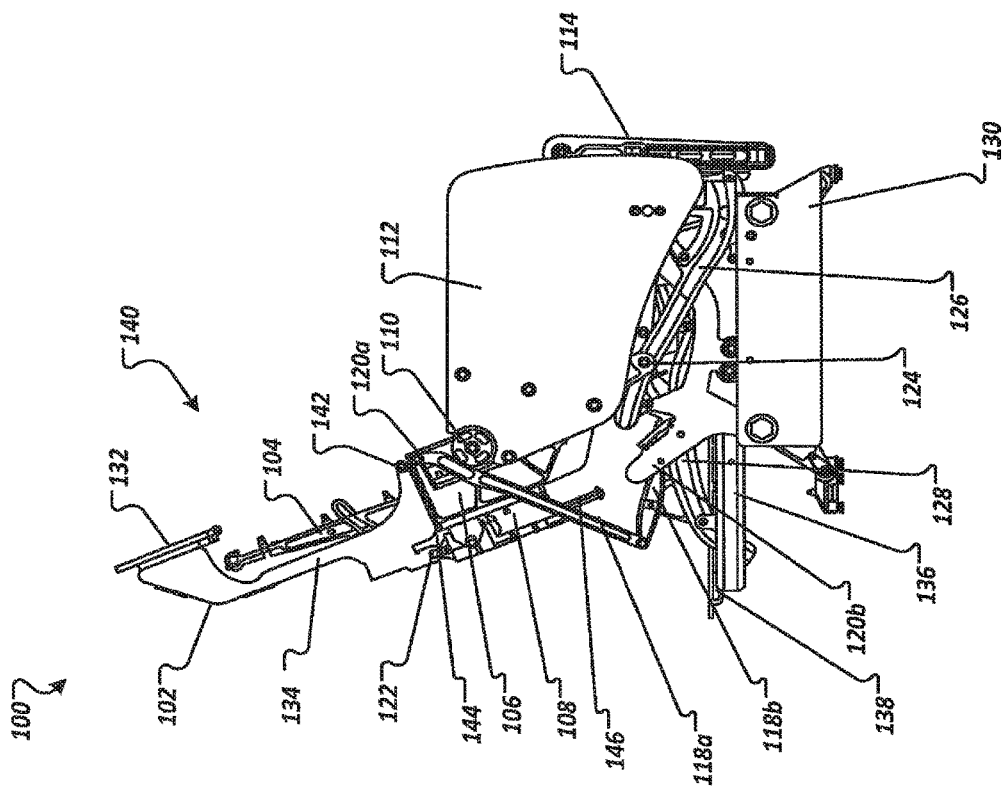
FIGS. 1-2 illustrate side views of an example frame for an aircraft seat with a seat back having multiple, actuator-controlled articulable components.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure may be directed to an aircraft passenger seat that includes a seat back frame with multiple actuator-controlled components that articulate with respect to one another to move the seat between an upright, taxi, take-off, and landing (TTOL) position, a fully reclined, lie-flat position, and various positions between the TTOL and lie-flat positions. In some implementations, the aircraft seat may include a seat back frame with an upper portion and a lower portion that are rotatably coupled to one another so that each portion of the seat frame can be positioned at a different angle to provide a more ergonomic experience for a passenger seated in the aircraft seat. In addition, an inner diaphragm may be positioned forward of the upper portion of the seat back frame to provide a third degree of freedom with respect to seat back articulation. The inner diaphragm may be configured to support an upper back and shoulders of the passenger. In some examples, the upper portion of the seat back frame may also articulate forward of the TTOL position in order to provide additional space aft of the passenger seat when the seat is not occupied by a passenger or during a crash situation. In some implementations, cooperative articulation of the inner diaphragm and upper and lower portions of the seat back frame may be controlled by single motor-controlled actuator, which may contribute to a reduction in weight of the aircraft seat.

FIG. 1 illustrates a side view of an example frame for an aircraft passenger seat 100 that includes a seat back 140 with multiple articulable components that provide for cooperatively moving the seat 100 between an upright, TTOL position and a lie-flat position, according to some aspects of the present disclosure. In some examples, the seat back 140 may also articulate forward of the TTOL position. The seat back 140 may be articulably (also referred to as pivotably or rotatably) coupled to a seat bottom 702 (FIG. 7), and the seat bottom 702 may in turn be articulably coupled to a foot rest 114. In addition, the seat 100 may also include side panels 112 that are disposed on either side of the seat 100 and may also function as arm rests 112 when the seat 100 is in an upright or lounge positions or to prevent the passenger from rolling out of the seat 100 when the seat 100 is in the lie-flat position. The side panels 112 may be articulably mounted to the seat 100 at main pivot point 110. In some implementations, the main pivot point 110 may connect at least one of the seat back 140, seat bottom 702, and side panels 112 to a main roller 124 that slideably translates forward and aft across a main guide track 126 that is fixedly mounted to a base 130 of the seat 100. In this manner, all components of the seat 100 may smoothly translate together, such that arm rests 112 move on coordination with the reclining of the seat back 140, translation of the seat bottom 702, and raising of the foot rest 114 to provide a passenger with a comfortable arm rest position through a wide range of passenger seat positions. For example, in a recline position of FIG. 7, in bed lounge position of FIG. 8, and an upright seating position of FIG. 1, the arm rests 112 may maintain a comfortable and ergonomic position for passenger use. For example, an elbow bend angle may be maintained between the upright seating position of FIG. 1 and the reclined sitting position of FIG. 7 by pivoting the arm rests 112 about the pivot point 110 in coordination with the angling of the seat back 140 into the reclined position.

In some examples, as the seat 100 articulates toward a lie-flat position, the main roller 124 translates forward (to the right in FIG. 1) along the main guide track 126 in response to a driving motion of a drive mechanism 136. The drive mechanism 136, for example, may include an automated drive component, such as a motor or servo, mounted between two mounting elements on either side of a seat pan portion of the seat bottom frame. The mounting elements, in some embodiments, are extendable mounting elements. In other embodiments, the mounting elements are stationery. In some embodiments, the forward motion of the automated drive component of the drive mechanism 136 engages an actuating mechanism 108 that is configured to control articulation of an upper seatback portion of the seat 100. In other embodiments, the actuating mechanism 108 includes a separate automated drive component (e.g., an electrical component such as a motor or servo). The actuating mechanism 108 may include an output arm or rod configured to control one or more of the actuator-controlled components of the seat 100.

In some implementations, the seat 100 includes an electrical mount 138 connected to the base 130. The electrical mount 138 may cooperatively translate forward and aft between the upright and lie-flat positions. The electrical mount 138 may support apparatus for electrical power distribution for powering the drive mechanism 136, actuating mechanism 108, and/or a foot rest actuator.

In some embodiments, the seat 100 includes linkage with linkage segments 118a, 118b that may be configured to pivotably rotate about secondary pivot points 120a, 120b in order to maintain a substantially constant relative distance between the secondary pivot points 120a, 120b. In one example, an upper secondary pivot point 120a may be positioned at an upper end of a lower portion 106 of the seat back 140, and a lower secondary pivot point 120b may be pivotably mounted to a rear frame 128 that is a part of the base 130. In some implementations, as the seat 100 reclines toward the lie-flat position and the linkage 118 pivots to maintain the relative distance between the secondary pivot points 120a, 120b, the rotation of linkage segment 118b may cause the rear frame 128 to pivot upward until the seat progresses forward the full length of the main guide track 126. Upon reaching the end of travel, the upper secondary pivot point 120a and thus the lower portion 106 of the seat back 140 articulate to the lie-flat position. Details regarding articulation of the seat 100 between the upright and lie-flat positions are discussed further below.

In some implementations, the base 130 is mounted to a floor of an aircraft cabin according to a seating configuration. For example, the seat 100 may be included in a premium class passenger suite, such as a first class or business class suite that may provide more space for articulating the seat 100 to the lie-flat position than a passenger seat in a coach class section of the aircraft cabin.

Figure 2:
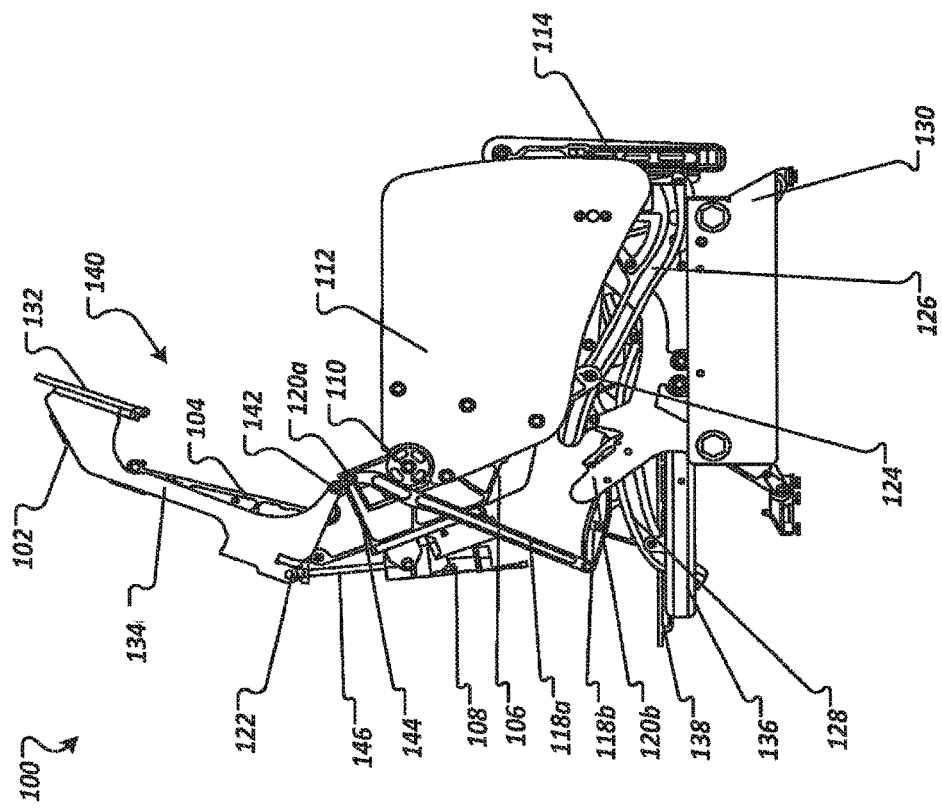

In some embodiments, the seat back 140 includes an upper portion 102 having a headrest 132 mounted at an upper end of upper side frame members 134 that may be articulably coupled to lower side frame members of a lower portion 106 of the seat back 140 at pivot point 142. For example, the upper portion 102 may be configured to pivot forward of the lower portion 106 about the pivot point 142 as shown in FIG. 2 in response to engagement by actuating mechanism 108. In addition, the upper portion 102 of the seat back 140 may also include an inner diaphragm 104 positioned between the upper side frame members 134 and the headrest 132 and may be articulably coupled to the upper portion 102 and the lower portion 106 of the seat back 140 at the pivot point 142. Stated another way, the inner diaphragm 104 may be positioned forward of the upper side frame members 134 and aft of the headrest 132 to provide support for an upper back and shoulders of a passenger seated in the aircraft seat 100.

In some implementations, the inner diaphragm 104 pivots independently of the articulation of the upper portion 102, which may provide a third degree of freedom with respect to articulation of the seat back 140, which may enable passengers to achieve more ergonomic postures while seated in the seat 100. As will be discussed further herein, the inner diaphragm 104 may allow a passenger's shoulders to nestle backward relative to the headrest 132 due to rearward articulation of the inner diaphragm 104 while the upper portion 102 of the seat back 140 remains substantially stationary. In some embodiments, the rearward rotation of the inner diaphragm 104 is achieved without use of an additional motor or actuator other than the actuating mechanism 108. For example, as the actuating mechanism 108 operates to cause reclining of the lower portion 106 of the seat back 140 (e.g., counterclockwise rotation of the lower portion 106 as shown in FIG. 1), the inner diaphragm 104 may also cooperatively rotate with the lower portion 106 of the seat back 140 (e.g., in the counterclockwise direction) as in the design shown in FIG. 1.

In some implementations, the actuating mechanism 108 and/or the drive mechanism 136 includes a linear actuator that is motor-driven, such as by a servomotor or a stepper motor. For example, rotation of the motor may cause extension and/or retraction of one or more actuator rods to cause articulation of the upper portion 102, lower portion 106, and/or inner diaphragm 104 of the seat back 140. In one example, the actuating mechanism 108 may include an output arm or rod 146 connected to the upper portion 102 of the seat back 140 at a receiving flange 122 and may extend upward to cause forward rotation of the upper portion 102 of the seat back 140 relative to the lower portion 106. Similarly, retraction of the rod 146 tray cause rearward rotation of the upper portion 102 relative to the lower portion 106. In other examples, the actuating mechanism 108 may be another type of linear actuator such as a pneumatic actuator, a belt-driven actuator, or a screw-driven actuator. In some implementations, the actuating mechanism 108 with a single motor may alone be responsible for causing articulation of the seat 100 through the various positions described further herein. In other embodiments, multiple coordinated actuators may be used to generate the articulations of the seat 100 described and illustrated herein.

In addition, the actuating mechanism 108 may cause articulation of the components of the seat 100 in response to a control signal received from a controller that receives inputs from a passenger at an interface for an input/output (I/O) device proximate the seat 100 and/or a cabin attendant at an I/O device at a flight attendant station. In some implementations, the I/O device (not shown) may be a control panel with buttons and/or a touchscreen positioned at an armrest or monitor forward of the seat 100 that allows a passenger to select a desired position for the seat 100. In response to receiving the selected position, the controller may issue control signals to the actuating mechanism 108 and/or the drive mechanism 136 to cause coordinated articulation of the actuator-controlled components of the seat 100. Further, in the event of an emergency situation (e.g., rapid deceleration, heavy turbulence, etc.), a master controller (e.g., in communication with the flight attendant station or another controller) may issue commands causing the seat 100 and other seats positioned within the cabin to automatically return to a TTOL position.

As shown in FIG. 1, the upper portion 102 of the seat back 140 is shown in first position which may be a TTOL or stowed position. In this position, the upper portion 102 of the seat back 140 may be deployed in-line (e.g., zero- or near-zero-degree angle) with the lower portion 106 of the seat back 140 such that a lower surface of the upper portion 102 abuts and/or rests against an upper ledge 144 of the lower portion 106 of the seat back 106. In another embodiment, the TTOL position may involve the upper portion 102 of the seat back 140 being rotated forward from the upper ledge 144 at an angle of 1-30 degrees relative to the lower backrest frame. In selected embodiments, that angle may be 3-20, 5-20, 3-15, 3-15, 3-10, or 5-10 degrees. In one embodiment, the TTOL position may be similar to that shown in FIG. 1, except that the upper portion 102 of the seat back 140 may be deployed at an angle of 5-10 degrees forward of the lower portion 106 of the seat back 140.

Turning to FIG. 2, a side view of the seat 100 is illustrated in which the upper portion 102 of the seat back is rotated forward to a second position from the pivot point 142 between the upper portion 102 and lower portion 106. In some implementations, the actuating mechanism 108 may include output arm or rod 146 connected to the upper portion 102 of the seat back 140 at receiving flange 122 and may extend upward to cause forward rotation of the upper portion 102 of the seat back 140 relative to the lower portion 106. For example, in response to receiving a control signal from a controller, a motor of the actuating mechanism 108 may rotate to cause the rod 146 to move upward thereby causing the upper portion 102 of the seat back 140 to articulate forward of the lower portion 106 about the pivot point 142. In some examples, the upper portion 102 may be configured to rotate forward until making contact with the inner diaphragm 104 positioned forward of the upper side frame members 134 of the upper portion 102.

In some implementations, the position of the seat back 140 shown in FIG. 2 in which the upper portion 102 is articulated to the forward position while the seat 100 is in the TTOL position may not be typically achieved when a passenger is seated in the seat 100. Rather, this FIG. 2 illustrates an exemplary range of motion of the upper portion 102 of the seat back 140. For example, in the depicted forward position, the upper portion 102 may articulate forward at an extension angle of about 45 degrees relative to the lower portion 106 of the seat back frame 140. In selected embodiments, the angle may be 40-50, 35-55, or 30-60 degrees forward of a longitudinal axis passing through the lower portion 106 of the seat back 140. In some examples, the extension angle corresponds to an angle between the upper ledge 144 of the lower portion 106 and a bottom surface of the upper portion 102.

In some aspects, the upper portion 102 of the seat back 140 may be intentionally rotated to the forward position while the seat 100 is in the TTOL position, such as to provide additional space to the rear of the seat 100 when the seat 100 is unoccupied or may also function as a breakover mechanism during a crash situation. In the breakover mechanism implementation, when the seat 100 experiences a high G-force event such as a crash event, the upper portion 102 and/or lower portion 106 of the seat back 140 may separately or cooperatively rotate forward to reduce a force of head impact by a passenger seated aft of the seat 100. For example, the high G-force event may cause the upper portion 102 to automatically rotate forward about the pivot point 142 between the upper portion 102 and lower portion 106 as shown in FIG. 2. Automatic rotation, for example, may be triggered by an acceleration sensor configured to identify a rapid deceleration event. Output of the acceleration sensor, for example, may be analyzed by the controller which outputs a control signal, in the event of rapid deceleration, to the actuating mechanism 108. In another example, the acceleration sensor may be coupled to local control circuitry for triggering movement of the actuating mechanism 108 to cause the seat 100 to move to the forward position. Additional examples of automatic break-over mechanisms for passenger seat seatbacks are described in U.S. patent application Ser. No. 15/610,167 entitled "Seat Back Breakover with Dynamically Triggered Actuator" and filed May 31, 2017, the contents of which are hereby incorporated by reference in its entirety.

Figure 3:
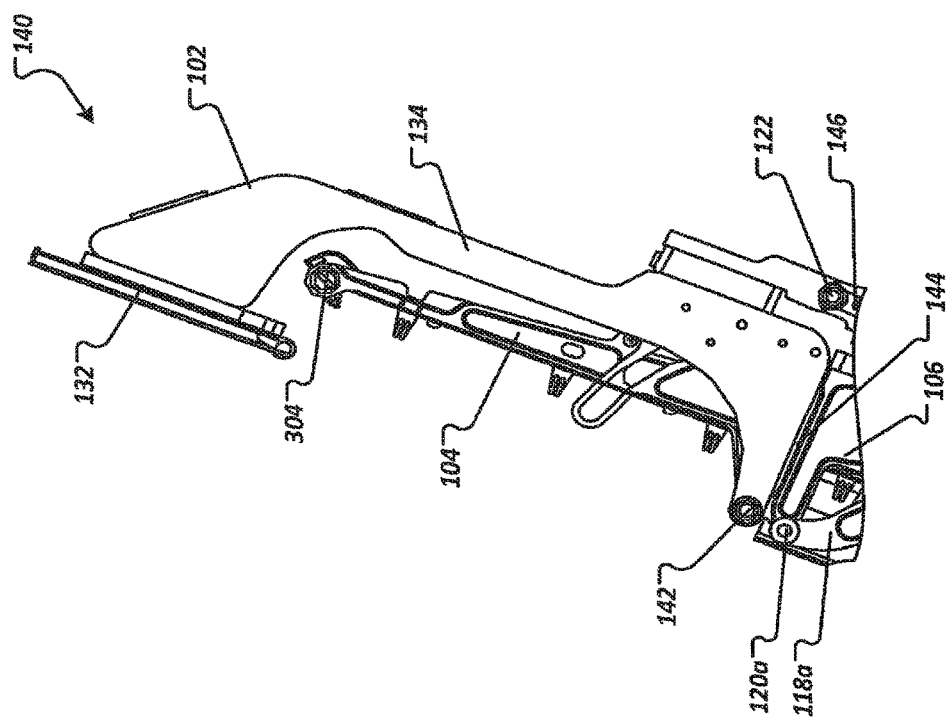
FIGS. 3-4 illustrate side views of an upper portion and inner diaphragm of an example frame for a seat back of an aircraft seat.
Figure 4:
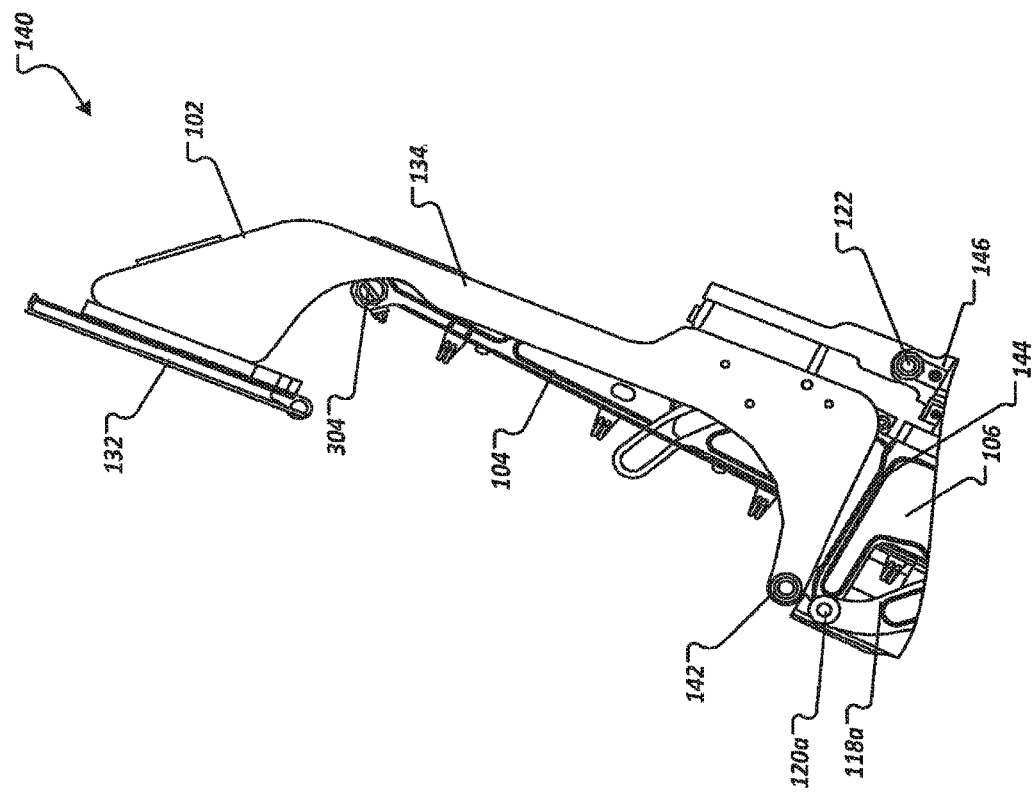
Figure 10:
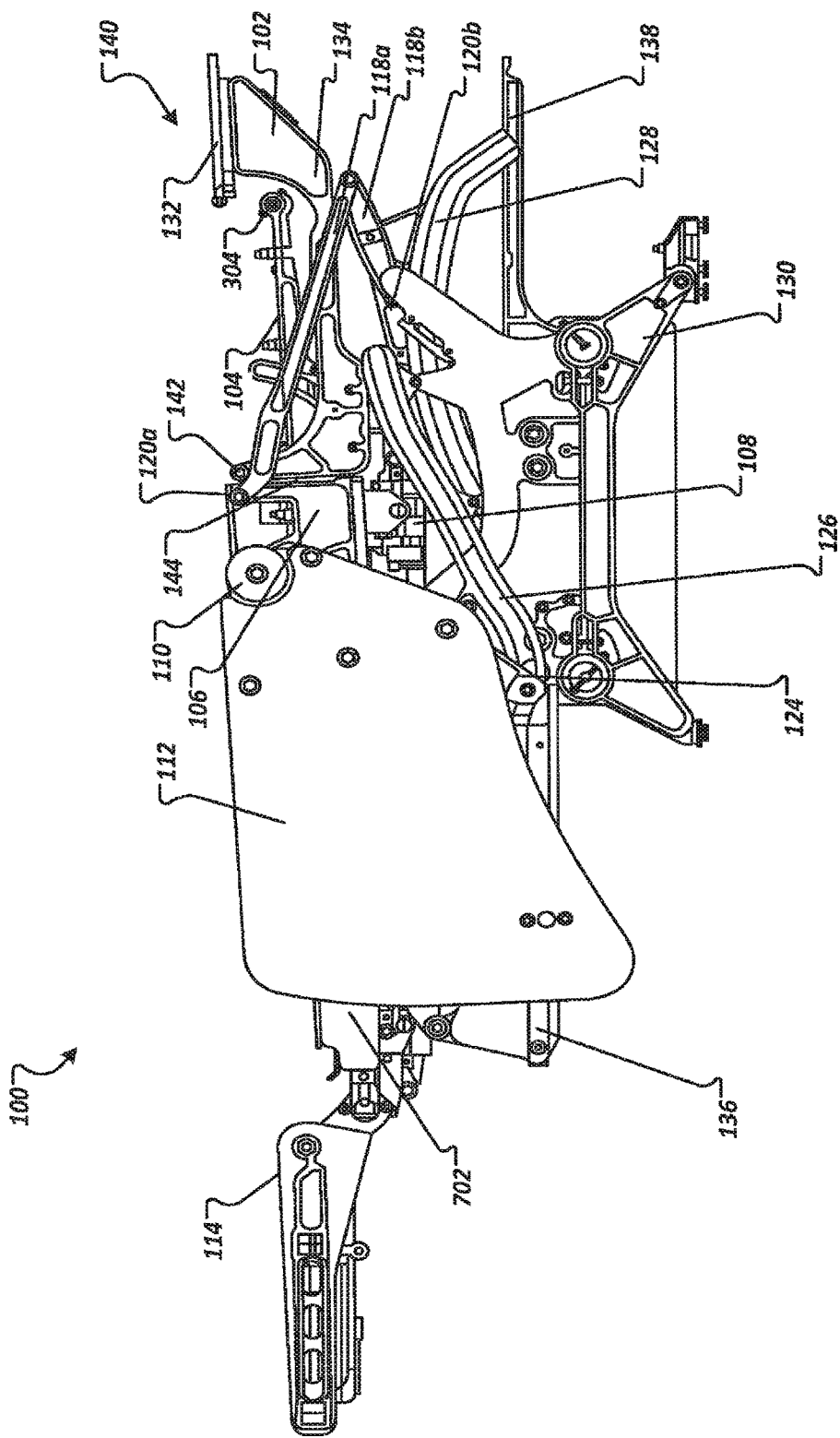
FIG. 10 illustrates a side view of an example frame for an articulable aircraft seat in a lie-flat bed position.

Turning to FIGS. 3-4, side views of the upper portion 102 and inner diaphragm 104 of the seat back 140 are illustrated, which show articulation of the inner diaphragm 104. For example, as shown in FIG. 3, the actuating mechanism 108 has caused articulation of the seat 100 to the upright, TTOL position, which may also be referred to as a stowed position. In the illustrated example, the upper portion 102 of the seat back 140 is at approximately 0 degrees relative to (e.g., aligned with) the lower portion 106 and inner diaphragm 104 of the seat back 140. In another embodiment, the upper portion 102 may be at a predetermined number of degrees relative to the lower portion 106 and approximately 0 degrees relative to the inner diaphragm 104, where the predetermined angle may be approximately 0-15, 5-10 or about 5 degrees. In some implementations, when an orientation angle the upper portion 102 is approximately 0 degrees relative to the inner diaphragm 104 as shown in FIG. 3, an upper transverse member 304 connecting side members 504 (FIG. 5) of the inner diaphragm 104 may not be in contact with the upper side frame members 134 of the upper portion 102 of the seat back 140. In some examples, the relative positions of the upper portion 102, lower portion 106, and inner diaphragm 104 shown in FIG. 3 may correspond to relative positions when the seat 100 is in a fully reclined, lie-flat bed configuration as illustrated in FIG. 10.

As shown in FIG. 4, the actuating mechanism 108 has caused articulation of the seat 100 to a partially reclined position. For example, extension of the rod 146 of the actuating mechanism 108 may cause the lower portion 106 of the seat back 140 to recline while also causing the upper portion 102 to cooperatively rotate forward relative to the lower portion 106 at a small angle. For example, the upper portion 102 may rotate forward relative to the lower portion 106 by about 6 degrees. In some examples, the inner diaphragm 104 may also cooperatively rotate to the partially reclined position with the lower portion 106. At the small angle (e.g., approximately 6 degrees of forward articulation of the upper portion 102), the transverse member 304 at the upper end of the inner diaphragm 104 may come in contact with the upper portion 102 of the seat back 140. In other embodiments, this engagement occurs not at 6 degrees but rather 5-10, 5-15, 5-25, 10-25 or 10-20 degrees. The forward rotation of the upper portion 102 relative to the lower portion 106 may occur as the seat 100 articulates to a partially reclined lounge position illustrated in FIG. 7 (e.g., including a raised position of the legrest 114).

The implementations of the seat back 140 including the upper portion 102, lower portion 106, and inner diaphragm 104 described herein provide an advantage that the shoulders of a seated passenger may be allowed to nestle backwards against the inner diaphragm 104 relative to the headrest 132, which may enhance passenger comfort. Significantly, this may be achieved in certain embodiments without use of motors or actuators in addition to the actuator 108. As can be appreciated from the implementations described herein, the inner diaphragm 104 can serve as a shoulder-supporting structure that may come back into alignment (e.g., substantially the same relative orientation angle) with a headrest 132 of the seat 100 in a lie-flat position as illustrated in FIG. 10. Again, this may be achieved without the use of an additional motor or actuator.

Another aspect of implementations described herein may be the additional degree of segmentation of the seat back 140 provided by the inner diaphragm 104. Without the articulation of the inner diaphragm 104 relative to the upper portion 102, the seat 100 would provide fundamentally a dual-segmented seat back with the upper portion 102 and lower portion 106. With the addition of the articulating inner diaphragm 104, a third degree of freedom (a third articulating segment) is provided. In addition, the implementations described herein may permit a lower seat back cushion mounted to the lower portion 106, upper seat back cushion mounted to the upper portion 102, and headrest cushion mounted to the headrest 132 to articulate relative to one another all with the use of a single actuator assembly, such as the actuating mechanism 108.

Figure 5:
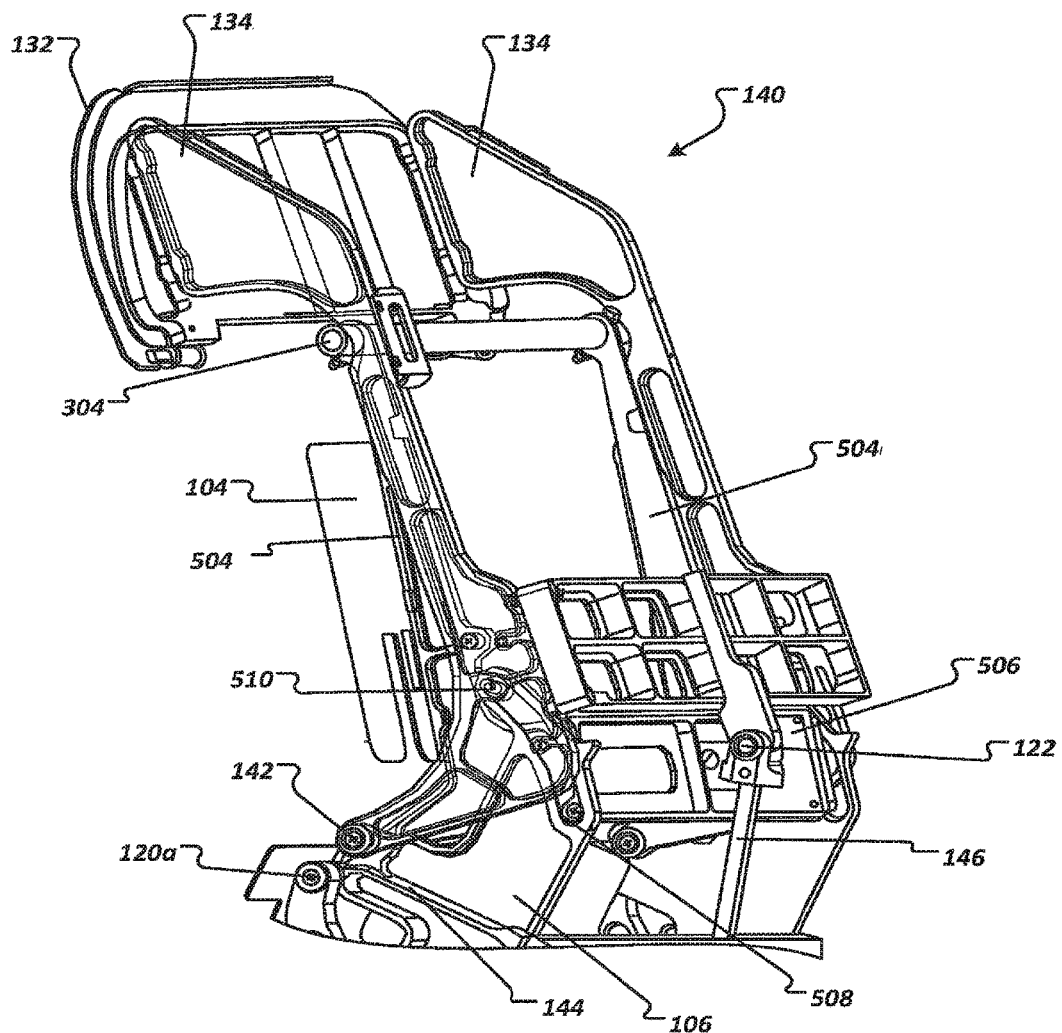
FIGS. 5-6 illustrate zoomed-in perspective views of a portion of an example seat back frame for an aircraft seat.
Figure 6:
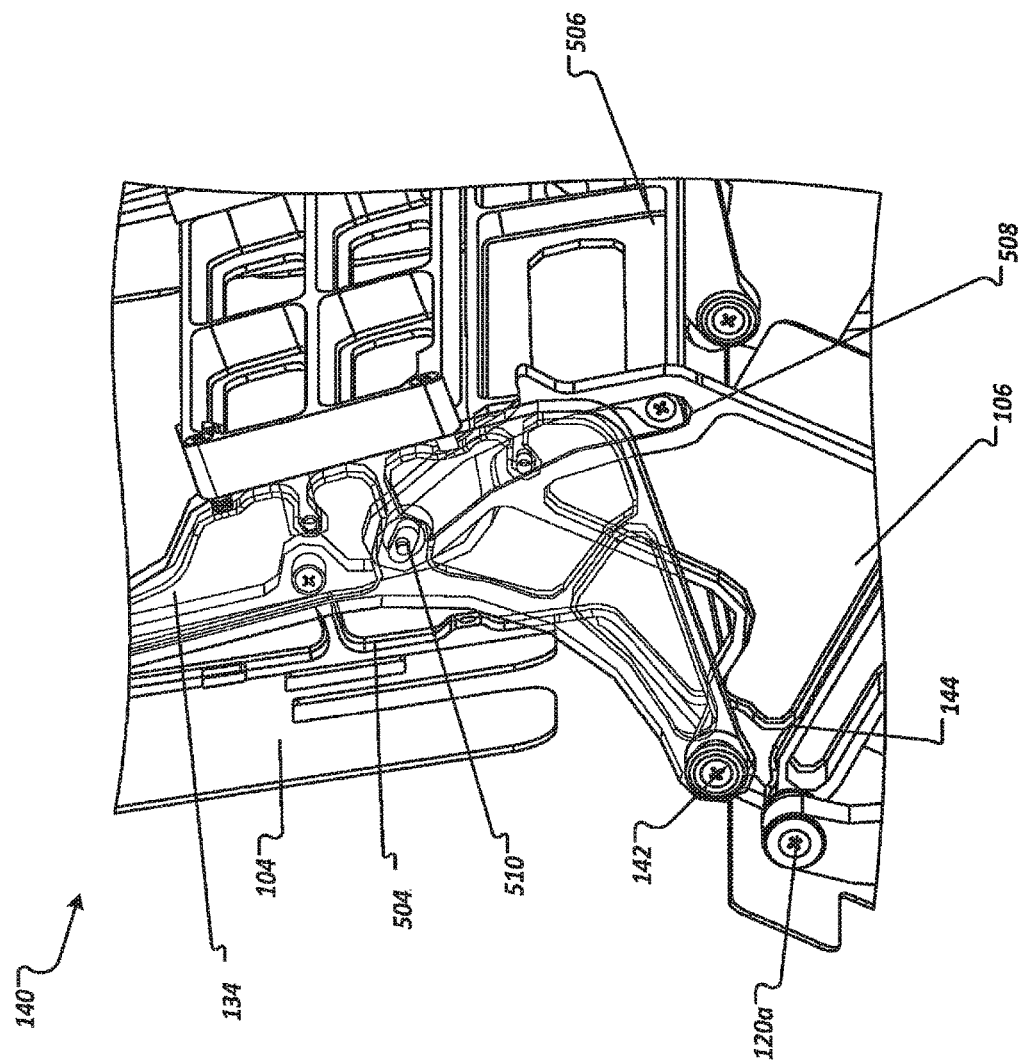

Turning to FIGS. 5-6, example rear perspective views of the seat back 140 for the articulating aircraft seat 100 are shown that illustrate articulation of the upper portion 102 relative to the lower portion 106. For example, both FIGS. 5 and 6 illustrate the seat back 140 where the upper portion 102 is rotated to a furthest forward position relative to the lower portion 106. Also, in FIGS. 5 and 6, the upper side frame member 134b of the upper portion 102 of the seat back 140 is shown as being transparent in order to more clearly illustrate the articulation of the upper portion 102 relative to the lower portion 106 to include engagement of guide roller 510 mounted to the inner surface of the upper side frame member 134b with a guide path 508 on the lower portion 106.

As shown in FIGS. 5-6, the seat back 140 may include an upper portion 102 having a headrest 132 mounted at an upper end of upper side frame members 134 that may be articulably coupled to lower side frame members of a lower portion 106 of the seat back 140 at pivot point 142. For example, the upper portion 102 may be configured to pivot forward of the lower portion 106 about the pivot point 142 in response to engagement by the output arm or rod 146 of the actuating mechanism 108 as the rod 146 extends. In addition, the upper portion 102 of the seat back 140 may also include an inner diaphragm 104 positioned between the upper side frame members 134 and the headrest 132. The inner diaphragm 104 may be articulably coupled to the upper portion 102 and the lower portion 106 of the seat back 140 at the pivot point 142. In some examples, the inner diaphragm 104 may include side members 504 separated by a transverse member 304 at an upper end and cross-member 506 at a lower end. The inner diaphragm 104, in some embodiments, is configured to abut or contact seat back cushioning designed to assist in ergonomic comfort of the passenger. The seat back cushioning, in one example, includes a foam material. In another example, the seat back cushioning includes an inflatable bladder system such as an inflatable air cushion.

In some examples, each of the lower side frame members of the lower portion 106 may include a guide path 508 defining a predetermined travel path for the upper portion 102 relative to the lower portion. In some aspects, the guide path 508 may be a curved groove or slot that a guide roller 510 mounted to an inner surface of each of the upper side frame members 134 of the upper portion 102 is configured to travel across as the upper portion 102 articulates forward and aft with respect to the lower portion 106 of the seat back 140. In some implementations, a rearmost and lowest point of the guide path 508 may correspond to a rearmost amount of rotation of the upper portion 102 with respect to the lower portion 106. The rearmost rotation may correspond, for example, to a point at which a lower surface of each of the upper side frame members 134 abuts or rests on the upper ledge 144 of the lower portion 106. In addition, a forward-most and highest point of the guide path may correspond to a forward-most amount of rotation of the upper portion 102 with respect to the lower portion 106. The forward-most amount of rotation, for example, may correspond to a point at which the upper portion 102 makes contact with the transverse member 304 of the inner diaphragm 104 when the inner diaphragm 104 is in a forward-most rotational position.

The travel path for the upper portion 102 defined by the guide path 508, in some embodiments, provides a degree of rotational freedom that cooperates with the main guide track 126 and pivot points 142, 120, and 110 and the articulation of the inner diaphragm 104 to provide the compound articulation of the seat 100 controlled by the actuating mechanism 108 as shown in figures described herein. In some implementations, the inner diaphragm 104 may be configured to cooperatively rotate with the upper portion 102 and/or lower portion 106 of the seat back 140 under the control of the actuating mechanism 108. In addition, the articulation of each of the upper portion 102, lower portion 106, and inner diaphragm 104 may be separately and individually controlled by the actuating mechanism 108 based on a desired position of the seat 100.

Figure 7:
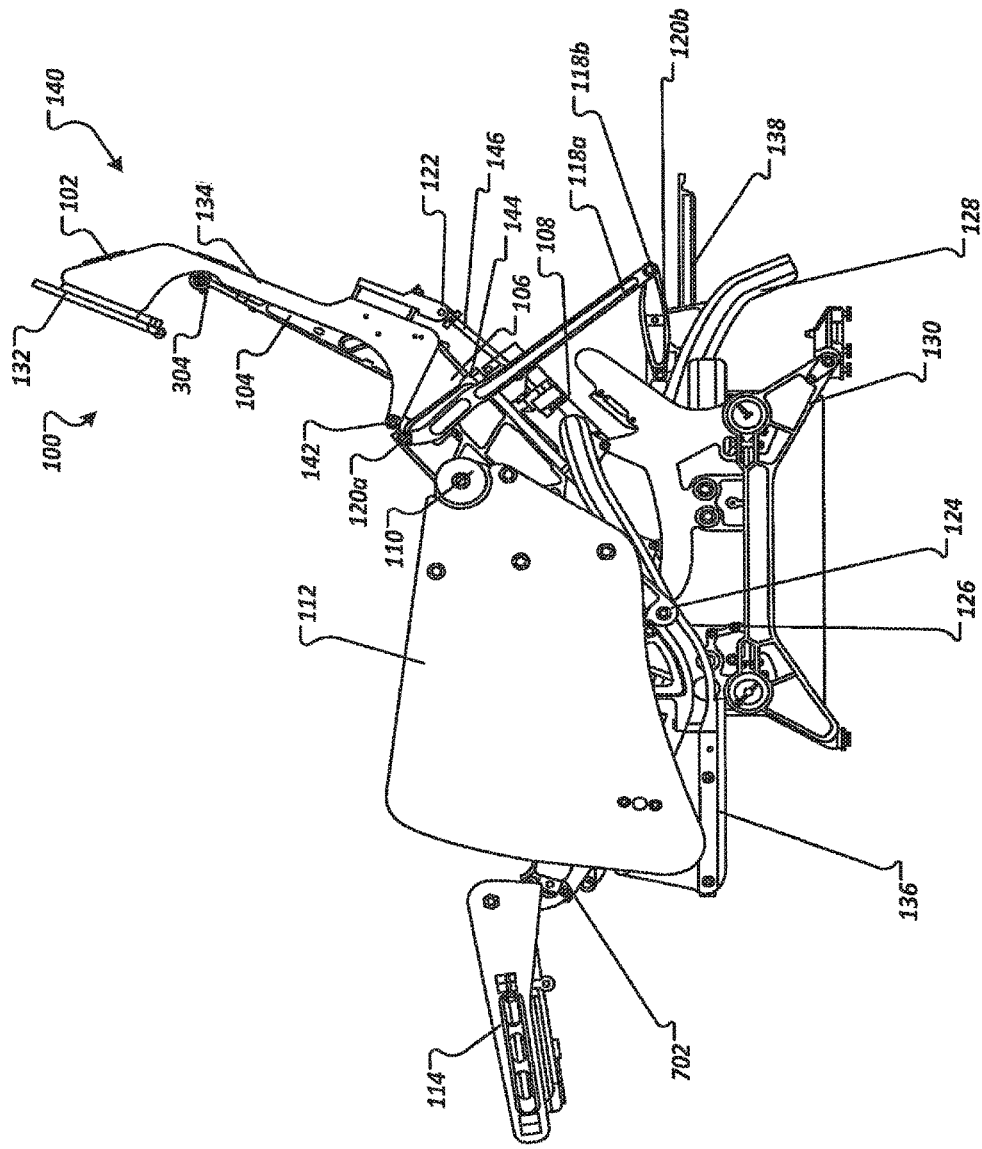
FIG. 7 illustrates a side view of an example frame for an articulable aircraft seat in a lounge position.
Figure 8:
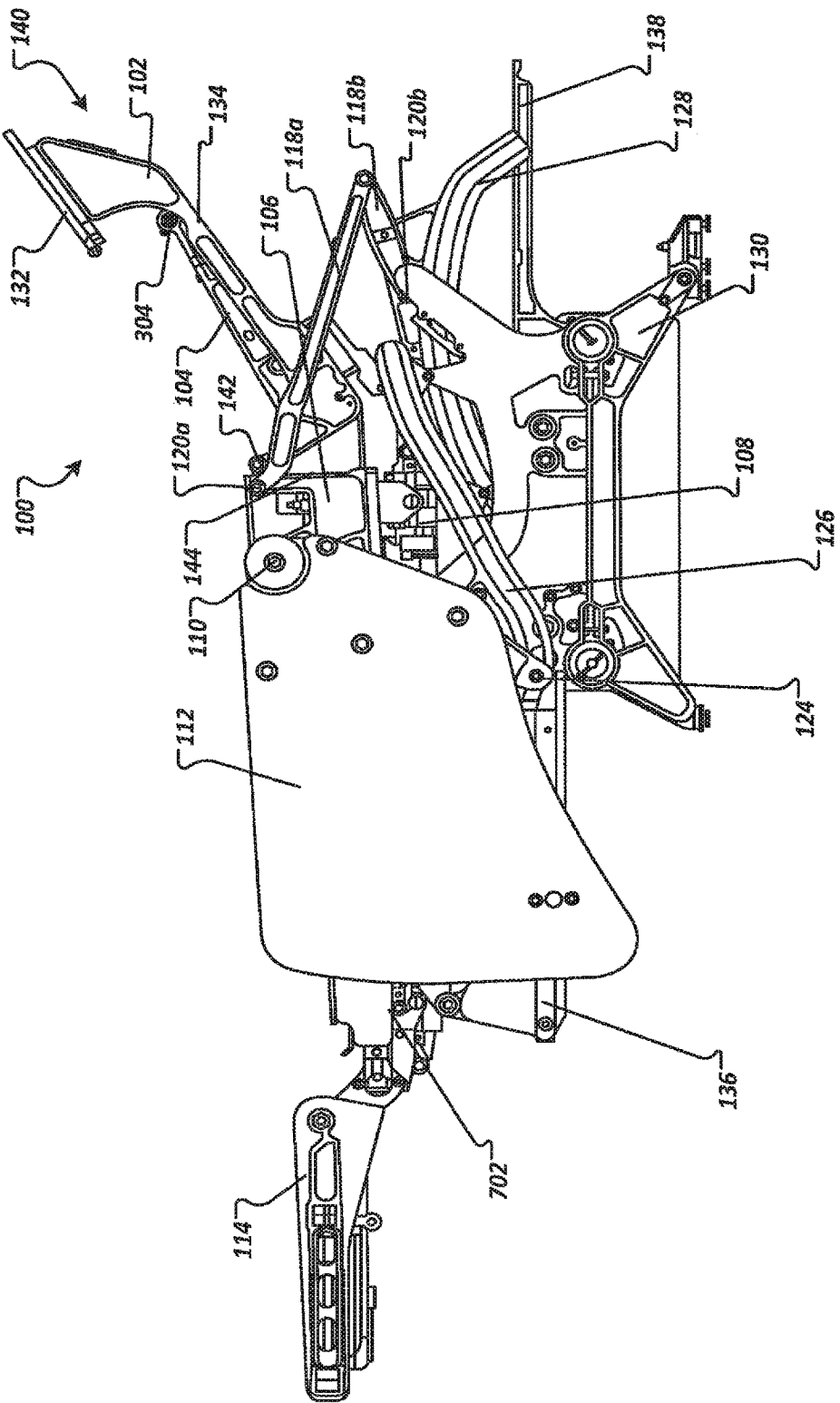
FIGS. 8-9 illustrate side views of an example frame for an articulable aircraft seat in a reclined bed position.
Figure 9:
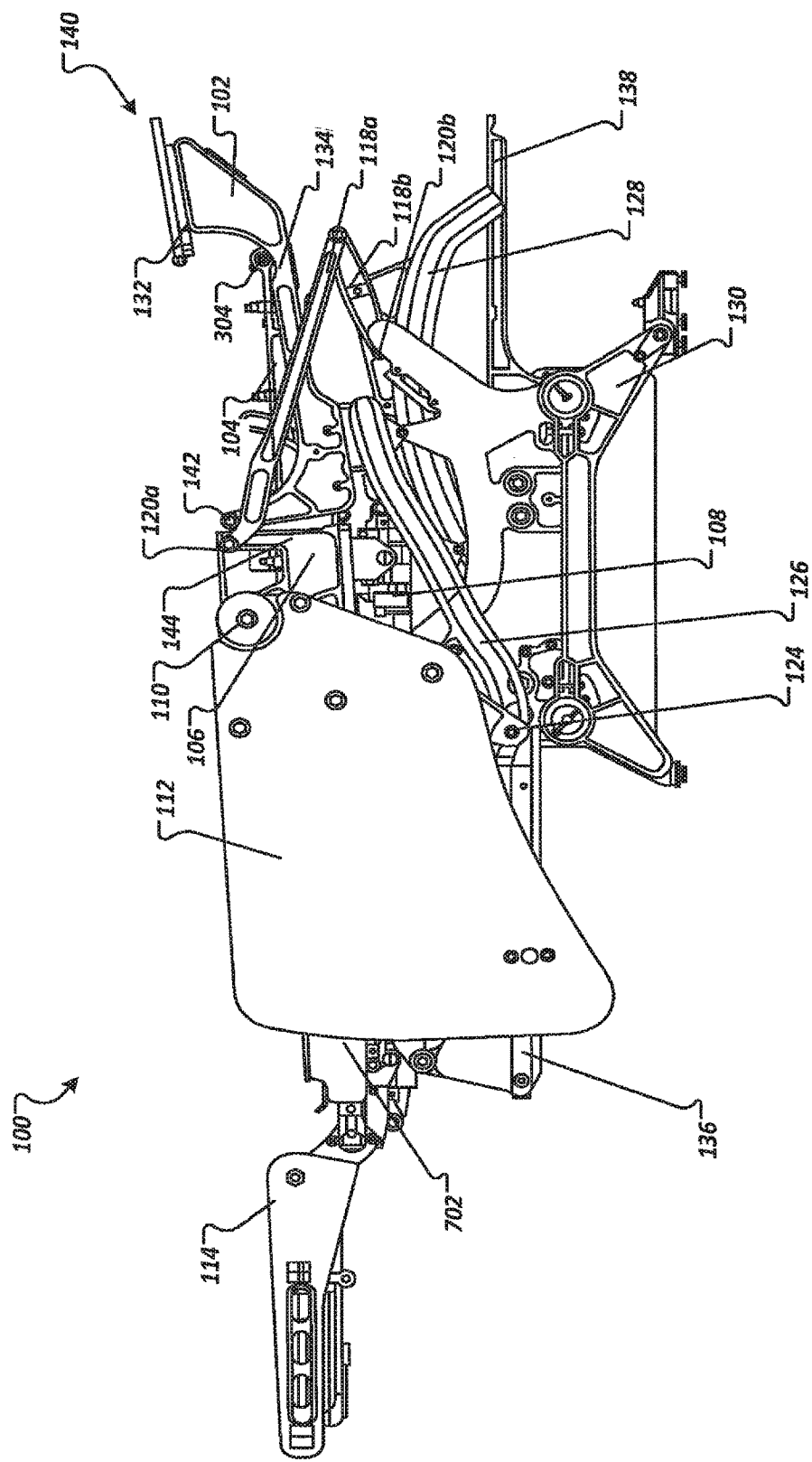

Turning to FIGS. 7-10, compound articulation of the components of the aircraft seat 100 under the control of the actuating mechanism 108 is illustrated. For example, FIG. 7 shows the seat 100 in a partially reclined lounge position, FIGS. 8-9 show the seat 100 in an in-bed lounge configuration with varied amounts of articulation of the upper portion 102 of the seat back 140 along with approximately horizontal position of the footrest 114, and FIG. 10 illustrates the seat 100 in a lie-flat bed configuration in which the headrest 132, seat back 140, and leg rest 114 are substantially aligned. The positions of the seat 100 depicted in FIGS. 7-10 are not meant to be limiting. For example, the actuating mechanism 108 can cause cooperative articulation of the seat 100 to any position between the upright, TTOL positions shown in FIGS. 1 and 2 and the lie-flat bed position shown in FIG. 10.

In some implementations, FIG. 7 illustrates the aircraft seat 100 in a partially reclined position that may be similar to the position of the portion of the seat back 140 illustrated in FIG. 4 in which the actuating mechanism 108 causes the lower portion 106 and inner diaphragm 104 of the seat back 140 to partially recline while the upper portion 102 of the seat back 140 rotates forward relative to the lower portion 106.

While the lower portion 106 and inner diaphragm 104 reclines to the lounge position from the upright, TTOL position, the upper portion 102 of the seat back 140 may rotate forward relative to the lower portion 106 so that the orientation of the upper portion 102 relative to a horizontal plane remains substantially stationary from its position in the upright, TTOL position as illustrated in FIG. 1. In some examples, the inner diaphragm 104 may also cooperatively rotate to the partially reclined position with the lower portion 106. In some examples, the transverse member 304 at the upper end of the inner diaphragm 104 may be in contact with the upper portion 102 of the seat back 140.

When in the lounge position as illustrated in FIG. 7, the lower portion 106 of the seat back 140 may be positioned at a first articulation angle, the inner diaphragm 104 may be positioned at a second articulation angle, and the upper portion 102 may be positioned at a third angle. Being able to position the components of the seat back 140 at three angles of articulation relative to a horizontal plane may provide, essentially, a three-part seat back that articulates into ergonomically optimal positions with the use of, in certain embodiments, a single actuator assembly, such as the actuating mechanism 108. The first articulation angle of the lower portion 106 may be, relative to horizontal, 45 degrees, 40-50 degrees, 35-55 degrees or more generally 30-60 degrees. The second articulation angle of the inner diaphragm 104 may be 60 degrees, 55-65 degrees, 50-70 degrees or more generally 45-75 degrees. The third articulation angle of the upper portion 102 may be about 65 degrees, about 60-70 degrees, about 55-75 degrees or more generally about 50-80 degrees.

In some implementations, the seat back 140 may be articulably coupled to seat bottom 702, which may in turn be articulably coupled to a foot rest 114. In addition, the side panels 112 that are disposed on either side of the seat 100 and may also function as arm rests 112 when the seat 100 the partially reclined lounge position. The side panels 112 may be articulably mounted to the seat 100 at main pivot point 110. In some implementations, the main pivot point 110 may connect at least one of the seat back 140, seat bottom 702, and side panels 112 to a main roller 124 that translates forward and aft across a main guide track 126 that is fixedly mounted to a base 130 of the seat 100.

In some embodiments, as the seat 100 articulates from the upright, TTOL position shorn in FIG. 1 to the lounge position shown in FIG. 7 under the control of the actuating mechanism 108, the main roller 124 translates forward (to the left as shown in FIG. 7) along the main guide track 126 in response to extension of an output arm or rod 146 of the actuating mechanism 108 that is configured to control the cooperative articulation of the articulable seat components. For example, as the rod of the actuating mechanism 108 extends to cause the seat back 140 to recline, the lower portion 106 of the seat back 140, side panel 112, and seat bottom 708 may cooperatively pivot about the main pivot point 110, which results in forward and downward translation of the main roller 124 along the main guide track 126. In addition, the articulation of the seat bottom 702 may cause the foot rest 114 to cooperatively rotate upward to a partially extended position.

In some examples, as the side panel 112 on each side of the seat rotates about the main pivot point 110 as the seat 100 articulates to the lounge position. In some examples, the linkage segments 118a, 118b may pivotably rotate about secondary pivot points 120a, 120b to maintain a substantially constant elan distance between the secondary pivot points 120a, 120b.

FIGS. 8-9 illustrate side views of the articulable aircraft seat 100 that has articulated to an in-bed lounge position under the control of the actuating mechanism 108. In the position of the seat 100 shown in FIG. 8, the lower portion 106 of the seat back 140, the seat bottom 702, the foot rest 114, and the side panels 112 have articulated to a fully extended position while the upper portion 102 of the seat back 140 including the inner diaphragm 104 may be rotated forward relative to the lower portion 106 such that the upper portion 102 and inner diaphragm 104 are at an incline angle relative to a horizontal plane. In some examples, the transverse member 304 at the upper end of the inner diaphragm 104 may be in contact with the upper portion 102 of the seat back 140. In the example shown in FIG. 8, the upper portion 102 and/or inner diaphragm 104 may be at approximately 34 degrees relative to the horizontal plane while the lower portion 106 may be at about 0 degrees relative to the horizontal plane. In other embodiments, the incline angle of the upper portion 102 of the seat back 140 may be 35 degrees, 30-40 degrees, 25-45 degrees, or more generally 25-50 degrees.

In some examples, as the seat 100 articulates from the lounge position shown in FIG. 7 to the in-bed lounge position shown in FIG. 8 under the control of the actuating mechanism 108, the main roller 124 may continue to translate further forward (to the left as show in FIG. 8) along the main guide track 126 in response to extension of an output arm or rod of actuating mechanism 108 that is configured to control the cooperative articulation of the articulable seat components. In addition, the lower portion 106 of the seat back 140, side panel 112, and seat bottom 708 may continue to pivot about the main pivot point 110, which results in further forward and downward translation of the main roller 124 along the main guide track 126 until the main roller 124 reaches a substantially lowest point on the main guide track 126 when the seat bottom 702 and foot rest 110 are fully extended to the bed position.

In some examples, the linkage segments 118a, 118b may pivotably rotate abort secondary pivot points 120a, 120b to maintain a substantially constant relative distance between the secondary pivot points 120a, 120b. In some implementations, as the seat 100 reclines toward the lie-flat position and the linkage segments 118a, 118b pivot to maintain the relative distance between the secondary pivot points 120a, 120b, the rotation of linkage segment 118b may cause the rear frame 128 may pivot upward until forward travel reaches the end of the main guide member 126. The linkage segments, after the seat has traveled the extent of the main guide track 126, guides the upper secondary pivot point 120a and thus the lower portion 106 of the seat back 140 to articulate to the lie-flat position.

The in-bed lounge position of the seat 100 shown in FIG. 9 is substantially similar to that shown in FIG. 8 except that the actuating mechanism 108 has caused the upper portion 102 and inner diaphragm 104 of the seat back 140 to recline further to a smaller incline angle from the horizontal plane. For example, the upper portion 102 may be at approximately 6 degrees relative to the horizontal plane while the inner diaphragm may be substantially aligned with the horizontal plane. In other embodiments, the incline angle of the upper portion 102 of the seat back 140 may be about 5 degrees, 3-10 degrees, 2-15 degrees, or more generally 1-20 degrees. In addition, the lower portion 106 and inner diaphragm 104 may be substantially aligned with the horizontal plane (e.g., disposed at approximately 0 degrees relative to the horizontal plane). In some examples, the linkage segments 118a, 118b may maintain the secondary pivot points 120a, 120b and thus the rear frame 128 in substantially the same position as shown in FIG. 8. In some examples, in the position of the seat 100 shown in FIG. 9, a seated passenger's head may be supported in a position above the passenger's shoulders, which may enhance comfort for such activities as reading a book while lying down.

Turning to FIG. 10, the seat 100 is illustrated in a lie-flat bed configuration, which is substantially similar to that shown in FIGS. 8-9 except that the actuating mechanism 108 has caused the upper portion 102 of the seat back 140 to recline further to a fully reclined position while the inner diaphragm 104 remains in the same position as in FIG. 9 such that the transverse member 304 at the upper end of the inner diaphragm 104 may no longer be in contact with the upper portion 102 of the seat back 140. In the lie-flat bed configuration, the upper portion 102, inner diaphragm 104, and lower portion 106 of the seat back 140 may all be aligned with one another (e.g., disposed substantially at zero degrees relative to one another), and the bottom surface of the upper portion 102 may abut the upper ledge 144 of the lower portion 106. In some examples, the linkage segments 118a, 118b may maintain the secondary pivot points 120a, 120b and thus the rear frame 128 in substantially the same position as shown in FIGS. 8 and 9. In the lie-flat bed position, the passenger's head may be supported in a position substantially even with (in horizontal alignment with) the passenger's shoulders.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. An aircraft passenger seat comprising:
a seat bottom frame;
a seat back frame pivotably mounted to the seat bottom frame for permitting the angle of the seat back frame relative to the seat bottom frame to be varied at least from an upright taxi takeoff and landing (TTOL) position to a reclined position, wherein the seat back frame further includes
a lower portion pivotably mounted to the seat bottom frame such that the seat back and the seat bottom frame cooperatively pivot between the upright TTOL position and the reclined position about a first pivot point, and an upper portion rotatably coupled to the lower portion, the upper portion including a set of side frame members, wherein the upper portion is configured to articulate in a forward direction relative to the lower portion about a second pivot point between the upper portion and the lower portion, and an inner diaphragm positioned between the set of side frame members of the upper portion and rotatably coupled to the upper portion and lower portion at the second pivot point, wherein the inner diaphragm is configured to articulate about the second pivot point independently of articulation of the upper portion to provide support for an upper back and shoulders of a seated passenger; and an actuating assembly configured to cause simultaneous articulation of each of the upper portion, the lower portion, and the inner diaphragm between the upright TTOL position and the reclined position.

2. The aircraft passenger seat of claim 1, wherein the actuating assembly comprises a motor-driven linear actuator.

3. The aircraft passenger seat of claim 1, wherein the actuating assembly includes an output arm coupled to the upper portion of the seat back frame at a receiving flange such that extension of the output arm causes the upper portion to articulate forward relative to the lower portion.

4. The aircraft passenger seat of claim 3, wherein the extension of the output arm of the actuating assembly when the seat is in the upright, TTOL position is configured to cause the lower portion of the seat back frame to articulate toward the reclined position.

5. The aircraft passenger seat of claim 1, further comprising: a seat base comprising a main guide track; and a main roller pivotably connected to the lower portion of the seat back frame and the seat bottom frame at a main pivot point, the main roller configured to slideably engage the main guide track as the aircraft passenger seat articulates between the upright TTOL position and the reclined position.

6. The aircraft passenger seat of claim 1, wherein the actuating assembly is configured to cause articulation of the seat back frame to a partially reclined position, wherein, in the partially reclined position, each of the lower portion, upper portion, and inner diaphragm is positioned at a different articulation angle relative to a horizontal plane.

7. The aircraft passenger seat of claim 1, wherein the actuating assembly is further configured to cause simultaneous articulation of each of the upper portion, the lower portion, and the inner diaphragm between the reclined position and a lie-flat bed position.

8. The aircraft passenger seat of claim 7, wherein, in the lie-flat bed position, the lower portion, the upper portion, and the inner diaphragm are substantially aligned with a horizontal plane.

9. The aircraft passenger seat of claim 1, further comprising a respective curved slot disposed on each side of the lower portion of the seat back frame, the curved slot configured to define a travel path for the upper portion relative to the lower portion.

10. The aircraft passenger seat of claim 9, further comprising a respective upper guide roller mounted to an inner surface of each of the set of side frame members of the upper portion, wherein the guide roller is configured to slideably translate within the curved slot as the upper portion articulates relative to the lower portion.

11. The aircraft passenger seat of claim 1, further comprising a linkage pivotably connecting a third pivot point on the seat back frame to a fourth pivot point on a base of the seat, wherein the linkage is configured to maintain a substantially constant relative distance between the third pivot point and the fourth pivot point as the seat articulates between the upright TTOL position and the reclined position.

12. The aircraft passenger seat of claim 11, wherein the fourth pivot point is disposed on a rear frame member pivotably mounted to the base of the seat such that pivoting of the linkage caused by articulation of the seat toward the reclined position causes upward rotation of the rear frame member to maintain the constant relative distance between the third pivot point and the fourth pivot point.

13. The aircraft passenger seat of claim 1, further comprising a set side panels pivotably mounted on each side of the seat bottom frame and seat back frame at the first pivot point, wherein the set of side panels are configured to cooperatively articulate with the seat bottom frame and seat back frame between the upright TTOL position and the reclined position.

14. The aircraft passenger seat of claim 1, further comprising a headrest mounted to an upper end of the side frame members such that the headrest is positioned forward of the first set of side frame members and above the inner diaphragm.

15. The aircraft passenger seat of claim 1, wherein the upper portion is configured to rotate forward about the first pivot point to provide additional head clearance for an aft-seated passenger in a rapid deceleration event.

* * * * *